United States Patent [19]

Kahn

[11] Patent Number: 4,665,548
[45] Date of Patent: May 12, 1987

[54] SPEECH ANALYSIS SYLLABIC SEGMENTER

[75] Inventor: Daniel Kahn, Gillette, N.J.

[73] Assignee: American Telephone and Telegraph Company AT&T Bell Laboratories, Murray Hill, N.J.

[21] Appl. No.: 539,792

[22] Filed: Oct. 7, 1983

[51] Int. Cl.$^4$ ............................................. G10L 5/00
[52] U.S. Cl. .................................. 381/43; 364/513.5
[58] Field of Search .................................. 381/29–53; 364/513.5, 513, 419

[56] References Cited

U.S. PATENT DOCUMENTS 4,336,421  6/1982  Welch et al. .......................... 381/43

OTHER PUBLICATIONS

Mermelstein, "Automatic Segmentation of Speech into Syllabic Units", Journal of the Acoustical Society of America, vol. 58, No. 4, Oct. 1975, pp. 800–883.
G. Ruske and T. Schotola, "An Approach to Speech Recognition Using Syllabic Decision Units," *Proceedings of the Conference on Acoustics, Speech and Signal Processing*, pp. 722–725, 1978.

Primary Examiner—E. S. Matt Kemeny
Attorney, Agent, or Firm—Jack S. Cubert

[57] ABSTRACT

A speech pattern is partitioned into its syllabic subunits by generating signals representative of the speech energy and autocorrelation features of the time frames portions thereof. The peak energy time frames are identified from the frame energy signals and the minimum energy time frames between each pair of successive peak energy frames of the speech pattern are determined from the time frame energy and autocorrelation feature signals. Candidate syllabic subunits are formed responsive to the peak and minimum energy frame characteristics and the autocorrelation feature signals. Signals corresponding to the duration and the energy of each candidate syllabic subunit peak energy frame relative to the energy of the other peak energy frames and the maximum peak energy frame of the speech pattern are formed and these signals are combined to produce a figure of merit for each candidate syllabic subunit. The sequence of syllabic subunits for the speech pattern are selected from the candidates by comparing the figure of merit signals of the candidate subunits.

23 Claims, 14 Drawing Figures

SPEECH ANALYSIS SYLLABIC SEGMENTER

TECHNICAL FIELD

My invention relates to speech analysis and, more particularly, to automatic arrangements for segmenting speech patterns.

BACKGROUND OF THE INVENTION

In various types of communication and data processing systems, it is advantageous to use speech interface arrangements for inquiries, commands, and exchange of data and other information. The complexity of speech patterns and variations therein among speakers, however, makes it difficult to construct satisfactory automatic speech recognition equipment. While acceptable results have been obtained in special applications restricted to particular individuals and constrained vocabularies, the limited accuracy of automatic speech recognizers has so far precluded wider utilization.

In general, automatic speech recognition arrangements are adapted to transform an unknown speech pattern into a frame sequence of prescribed acoustic features. These acoustic features are then compared to previously stored sets of acoustic features representative of identified reference patterns. The unknown speech pattern is identified as the closest matching reference pattern. The accuracy of identification is highly dependent on the features that are selected and the recognition criteria used in the comparisons. Where a large vocabulary of reference patterns is used, the storage requirements for the reference pattern features and the signal processing needed for comparison result in expensive data processing equipment and long delays in pattern recognition. It is well recognized that a speech pattern is a concatenation of a definite number of subunits and that a large vocabulary of reference patterns such as words or phrases may be replaced by a much smaller number of speech subunits such as syllables or demisyllables withut affecting the speech recognition process. As is well known in the art, segmentation of a speech pattern into syllabic units permits the use of a very small vocabulary of stored patterns to recognize an unlimited variety of speech patterns.

A syllable may be defined linguistically as a sequence of speech sounds having a maximum or peak of inherent sonority between the two minima of sonority. Priorly known arrangements for detecting syllabic segments are relatively complex, require high quality speech signals for segmentation, and have not been completely successful. The article "Automatic Segmentation of Speech into Syllabic Units" by Paul Mermelstein, *Journal of the Acousticsal Society of America*, Vol. 58, No. 4, October, 1975, pp. 880–883, for example, discloses an arrangement in which a modified energy function obtained from a high quality speech signalis transformed into a signal corresponding to human perception of "loudness". A search is made for minima in the "loudness" signal using an artificially generated convex hull function to evaluate energy peaks, depth of minima and time between peaks. Departures from true syllabification are accepted if they are consistent. For example, the "ty" porton of the word "twenty" maynot be detected as a single syllable and the fricative "sh" of the word "she" might be segmented as an independent syllable.

In the system disclosed in "An Approach to Speech Recognition Using Syllabic Decision Units" by G. Ruske and T. Schotola appearing in the *Processing of the Conference on Acoustics, Speech and Signal Processing*, Tuls, Okla., 1878, pp. 722–725, a speech signal is preprocessed to develop 22 specific loudness functions covering the frequency range of 70 Hz to 10 Hz arranged on a critical band rate scale. A modified and smoothed function is formed corresponding to the weighted sum of all 22 loudness functions to emphasize the middle and reduce the high portions of the frequency range. The modified function suppresses the influence of high energy fricatives and increases the loudness gain of vowels. The aforementioned techniques are adapted to provide syllabic segmentation with high quality speech and require extesive signal processing to deal with the effects of fricatives and other characteristics of speech patterns. There are, however, many applications for speech recognition where only limited quality speech signals are available, e.g., telephone connections, and the real time response requirement precludes prolonged segmentation processing. It is an object of my invention to provide improved syllabic segmentation in automatic speech analysis systems with limited quality speech patterns.

SUMMARY OF THE INVENTION

The invention is directed to an arrangement for partitioning a speech pattern into syllabic subunits in which signals representative of the speech energy in the successive frames of the speech pattern and signals representative of spectral features of the successive frames of said speech pattern are formed. A sequence of signals representative of the speech pattern peak energy frames is generated responsive to said speech pattern energy signals, and a signal representative of the minimum speech energy frame between each pair of successive peak energy frames is produced responsive to said speech energy signal sequence and said peak energy frame signal sequence. Candidate syllabic subunit signals and a set of candidate syllabic subunit characteristic signals are generated responsive to the peak and minimum energy frame signals and said spectral feature signals. A set of speech pattern syllabic subunits are selected responsive to said candidate syllabic subunit characteristics signals.

DETAILED DESCRIPTION

Figure 1:
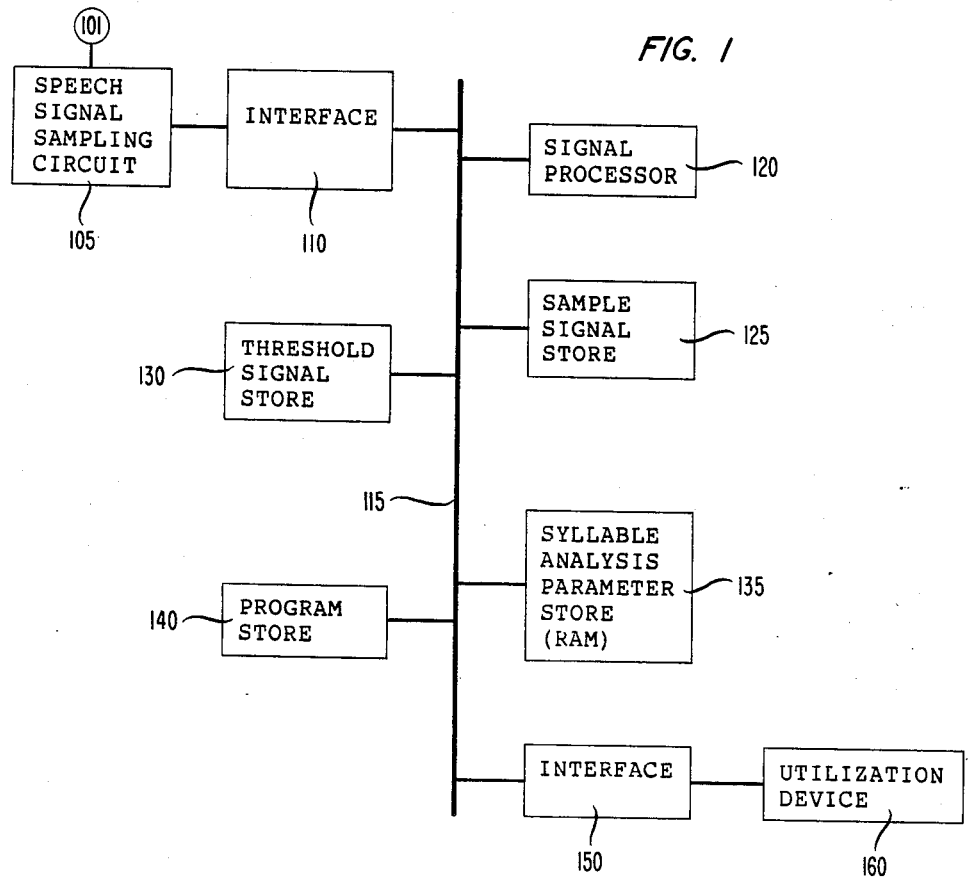
FIG. 1 depicts a general block diagram of a signal processing arrangement illustrative of the invention.

FIG. 1 shows a block diagram of a speech processor adapted to partition a speech pattern into syllabic subunits that is illustrative of the invention. An input speech pattern is applied to electroacoustic transducer 1:01, for example, a telephone handset, and the electrical signal therefrom is analyzed in speech signal sampling circuit 105. Transducer 101 may also be a microphone or a remotely connected telecommunication device over which voice signals can be transferred. Generator 105 is operative to band limit the speech signal from transducer 101 and to convert the band limited signal into a succession of speech sample codes xn as is well known in the art.

Figure 2:
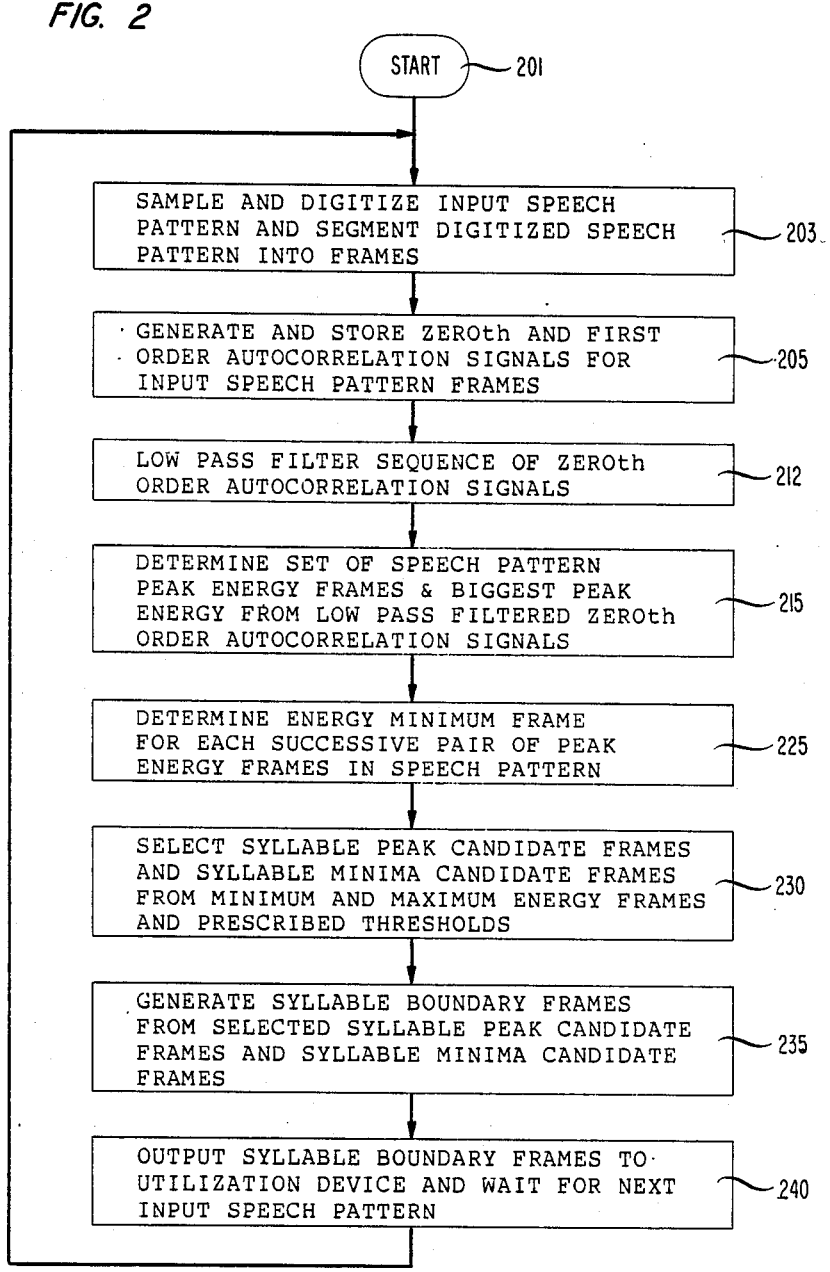
FIG. 2 shows a general flowchart illustrating operation of the circuit of FIG. 1.
Figure 14:
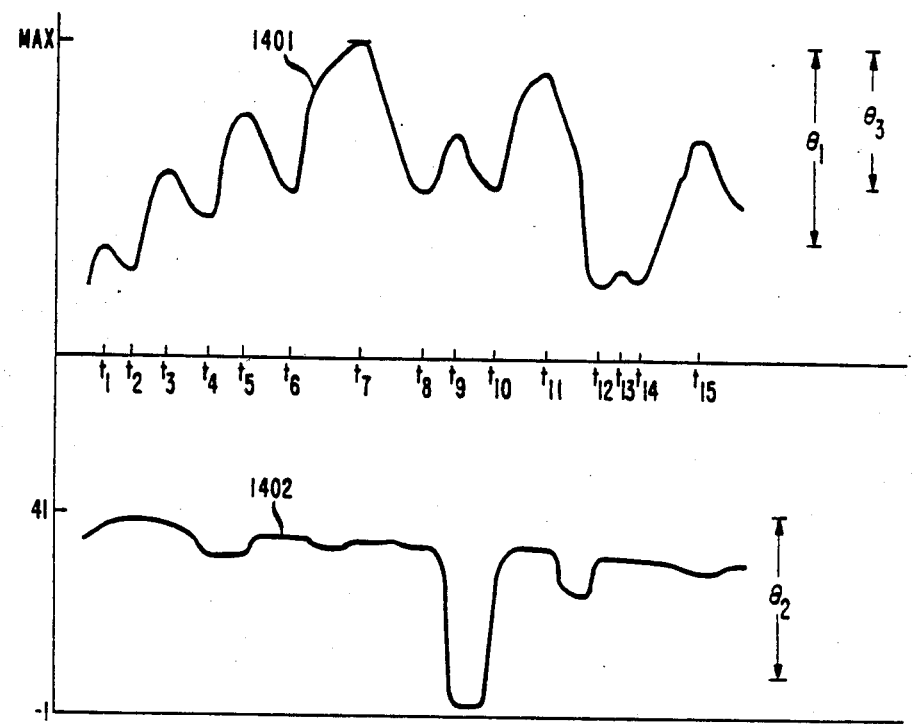
FIG. 14 shows waveforms useful in illustrating the operation of the circuit of FIG. 1.

FIG. 14 shows a representation of the energy pattern of a typical utterance. The circuit of FIG. 1 is operative to partition a speech pattern into its syllabic intervals so that the complex process of recognizing the continuous pattern can be reduced to the simpler process of recognizing a sequence of well-defined syllables. The partitioning is performed by determining the successive energy peaks of the waveform and the energy minima between the successive energy peaks. Syllabic peaks candidates are then selected on the basis of a prescribed set of empirically determined thresholds and syllabic minima candidates are selected on the basis of relationships between pattern energy minima and adjoining syllabic peak candidates. The syllabic peak and minima candidate frames are evaluated with reference to a set of predetermined thresholds and signals are generated representative of the frame locations of the successive speech pattern syllables. The set of thresholds comprises empirically determined measures of the deviation of waveform peaks from the biggest peak of the pattern, the magnitude of the normalized first autocorrelation coefficient, the separation of energy peak candidates, the relative energy of successive peak candidates and the depth of the energy minima candidates in relation to the adjacent syllabic peak candidates The flowchart of FIG. 2 illustrates the general operation of the circuit of FIG. 1. Referring to FIGS. 1 and 2, syllabic segmentation is initiated by filtering and sampling the input speech signal from transducer 101 in sampling circuit 105, and transferring the digitized speech sample sequence to sample signal store 125 via interface 110 and bus 115 as per operation box 203. The signal processor is then rendered operative under control of program store 14C to form a frame sequence of zeroth order autocorrelation signals $$E = \sum_{n=1}^{300} [x(n)h(n)]^2 \tag{1}$$

and a frame sequence of normalized first order autocorrelation signals $$AC1 = \sum_{n=1}^{299} x(n)h(n) \cdot x(n + 1)h(n + 1) \tag{2}$$

where x(n) is the nth speech sample of the current frame and h(n) is the nth term of the hamming window function. These autocorrelation signals are produced responsive to the speech signal sample codes xn stored in sample signal store 125 (box 205). The generated zeroth and normalized first autocorrelation signals are stored in syllable analysis parameter store 135.

Signal processor 120 may comprise a type 68000 microprocessor described in the publicaton MC68000 16 Bit Microprocessor User's Manual, second edition, Motorola Inc., 1980. The operation sequence of the signal processor is controlled by the permanently stored program instructions contained in profram store 140. These instructions are set forth in FORTRAN language form in the listing of the Appendix hereto.

As is well known in the art, the zeroth order autocorrelation signal for each frame is indicative of the speech energy of the frame. The local maximum energy frames are potential syllabic nuclei and values of the normalized first order autocorrelation coefficient in the range below zero are more indicative of the occurrence of fricatives. Waveform 1401 of FIG. 14 illustrates the sequence of frame energy signals in an utterance and waveform 1402 shows the corresponding normalized first order autocorrelation signals for the utterance. The speech pattern may be partitioned into a plurality of syllables each of which has a peak energy frame occurring between two minimum energy frames. It is well known, however, that not all speech energy minima frames are indicative of syllable boundaries. In accordance with the invention, the relationships between the low pass filtered energy pattern and the normalized first autocorrelation signal pattern of the speech patterns are analyzed to select frame sequences corresponding to syllables of the utterance.

The zeroth order autocorrelation signals in store 135 are low pass filtered in processor 120 as prescribed by the instructions permanetly stored in program store 140 (box 212). The set of peak speech energy frames are determined and the maximum of the peak energy frames is identified responsive to the low pass filtered speech energy signals in processor 120 (box 215). With reference to waveoform 1401, peak speech energy frames are located at points t1, t3, t5, t7, t9, t11, t13 and t15. After the peak energy frame sequence is placed in store 135, processor 120 is conditioned to determine a minimum energy frame for each pair of identified peak energy frames (box 225) by selecting the smallest energy frame between each pair of peak speech energy frames. At this point in the operation of the circuit of FIG. 1, the successive minima and maxima speech energy frames are identified. It is readily seen from a visual inspection of waveform 1401 in FIG. 14 that the peaks at t1, t9, and t13 in waveform 1401 may not be syllable nuclei so that syllable peak and minima candidate frames must be selected as per box 230. According to the invention, the selection is made on the basis of the ratio of the energy of the individual peaks to the maximum peak energy, the magnitude of the normalized first order autocorrelation coefficient at the peaks, and the depth of the minima between peak pairs. Any energy peak n for which $$\frac{ENER(n)}{MAX} > \text{theta 1} \tag{3}$$

where theta 1 is a predetermined threshold and MAX is the energy at the maximum energy peak of the speech pattern. In waveform 1401, for example, the peaks at t1 and t13 are more than theta 1 below the maximum peak at t7 and are discarded as possible syllable nuclei. When a peak is rejected, the greater adjacent energy minima is also eliminated. Peaks at which the normalized first order autocorrelation signal falls below threhsold theta 2 are not retained as candidate peaks. The peak at t9 in waveform 1401 is rejected on this basis. With respect to depth, the difference in energy between a minimum frame and each adjacent peak is generated and the depth is defined as the lesser energy difference. Where the lesser energy difference is less than a predetermined threshold theta 3, the minimum and the adjacent smaller energy peak are removed as candidates. In waveform, 1401, the depth of the minima at t8 and t10 may not meet the theta 3 threshold criteria.

Processor 120 is first conditioned to select the speech pattern peak energy frames having speech energy to maximum peak energy ratios greater than theta 1 and signals identifying the sequence of such energy frames are returned to store 135. When a peak frame energy is not sufficient, processor 120 is operative to eliminate the larger of the adjacent minimum frames from the minimum speech energy frame sequence in store 135. Processor 120 is then rendered operative to form a depth function for each successive pair of peak energy frames and the intermediate minimum energy frame and to remove the lesser peak energy frame and the corresponding minimum energy frame from the sequences of candidate frames where an insufficient depth is detected.

The relationships between the remaining peak and minima frames stored in store 135, i.e., differences in energy between adjacent peaks, duration of potential syllables, and deviation from maximum energy of peaks, are then tested in processor 120 to select syllable frames are then transferred to utilization device 160 via interface 150 (box 240). Utilization device 160 may comprise a syllable or demisyllable based speech analyzer of types that are well known in the art. The circuit of FIG. 1 then enters a wait state until another speech pattern is received by transducer 101.

Figure 3:
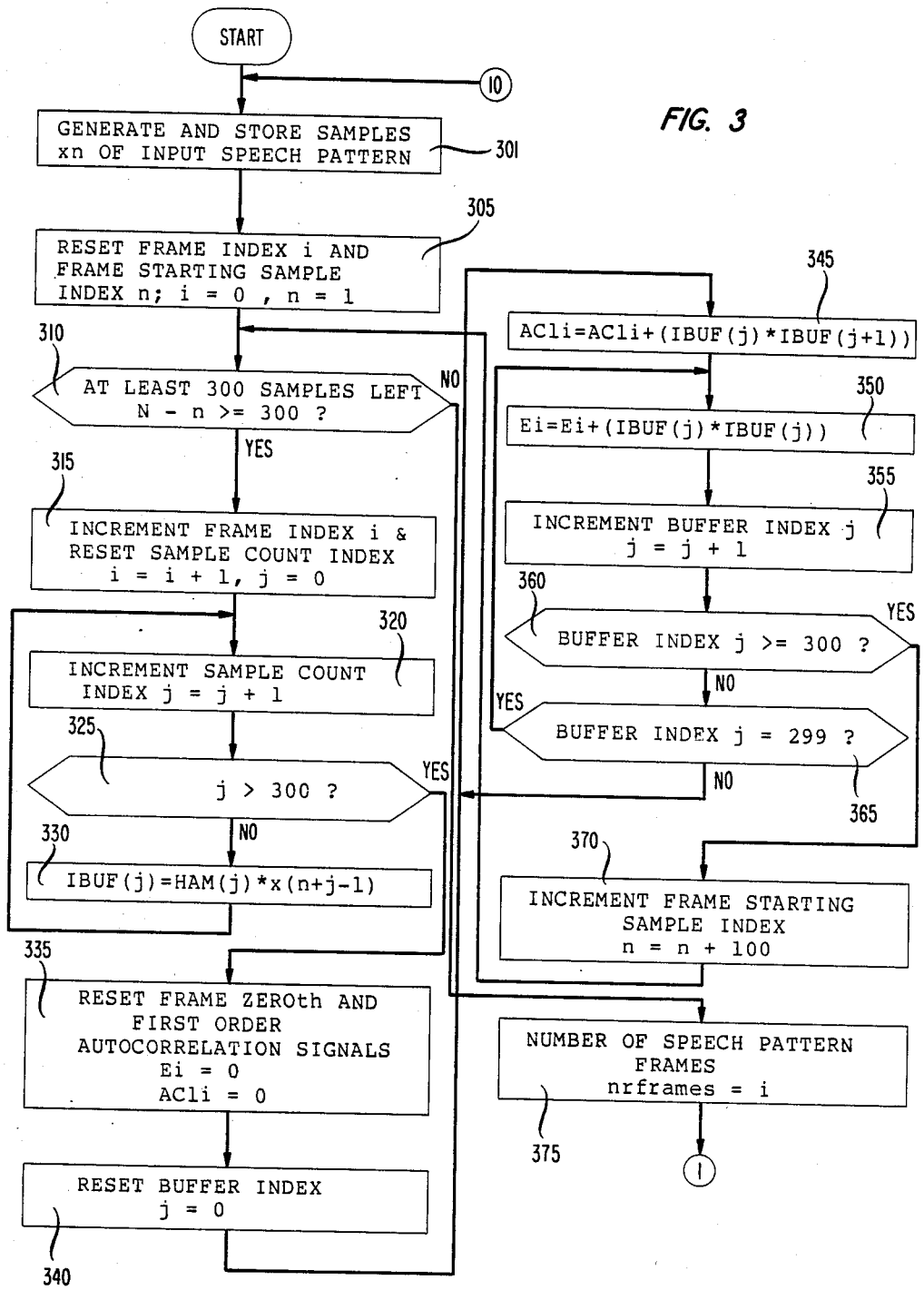

The flowchart of FIG. 3 shows in more detail the formation of the zeroth and first order autocorrelation signals indicated in boxes 203 and 205 of FIG. 2. Referring to FIG. 3, the speech samples xn generated in sampling circuit 105 are transferred to store 125 via interface 110 as per box 301. The speech patter frame index i is set to zero and the frame starting sample index n is set to one (bx 305). The number of samples in the current frame i is tested in processor 120 as indicated in boxy 31C. If the number of frames remaining in the speech pattern is at least 300, the frame index i is incremented and the frame sample count index j is reset to zero (box 315). After the frame sample count index j is incremented by one (box 320), box 325 is entered and the frame sample count index j is compared to the total number of samples in the frame (300) in processor 120. A hamming windowed sample signal IBUF(j) is generated for each successive frame sample $x(n+j-1)$ in processor 120 as per box 330 until $j=300$. At this point, the IBUF(j) signals for the current frame are available in store 135 and the zeroth and normalized first order autocorrelation signals for the frame can be produced.

The autocorrelation signals are generated in processor 120 as per boxes 335 through 265. Initially, the zeroth order autocorrelation signal Ei and the first order autocorrelation signal AC1i are reset to zero for the current frame (box 335) and the buffer index j is reset to zero (box 340). The AC1i and Ei signals are formed in processor 120 as per boxes 345 and 350 for the current sample buffer count index j and the buffer count index j is incremented to $j+1$.

When $j=299$, box 350 is reentered via decision box 365 and the Ei signal generation is completed in box 350. After the 300th buffer sample has been processed, box 370 is entered via decision box 360. The frame starting sample index n is incremented by 100 and control is passed to box 310 for the generation of the Ei and AC1i autocorrelation signals of the next frame. In this way, autocorrelation signals are formed for 300 sample frames that are overlapped by 100 samples. When less than one frame of samples remains unprocessed, box 375 is entered from box 310 so that the total number of frames nr in the speech pattern are stored in store 135.

Figure 4:
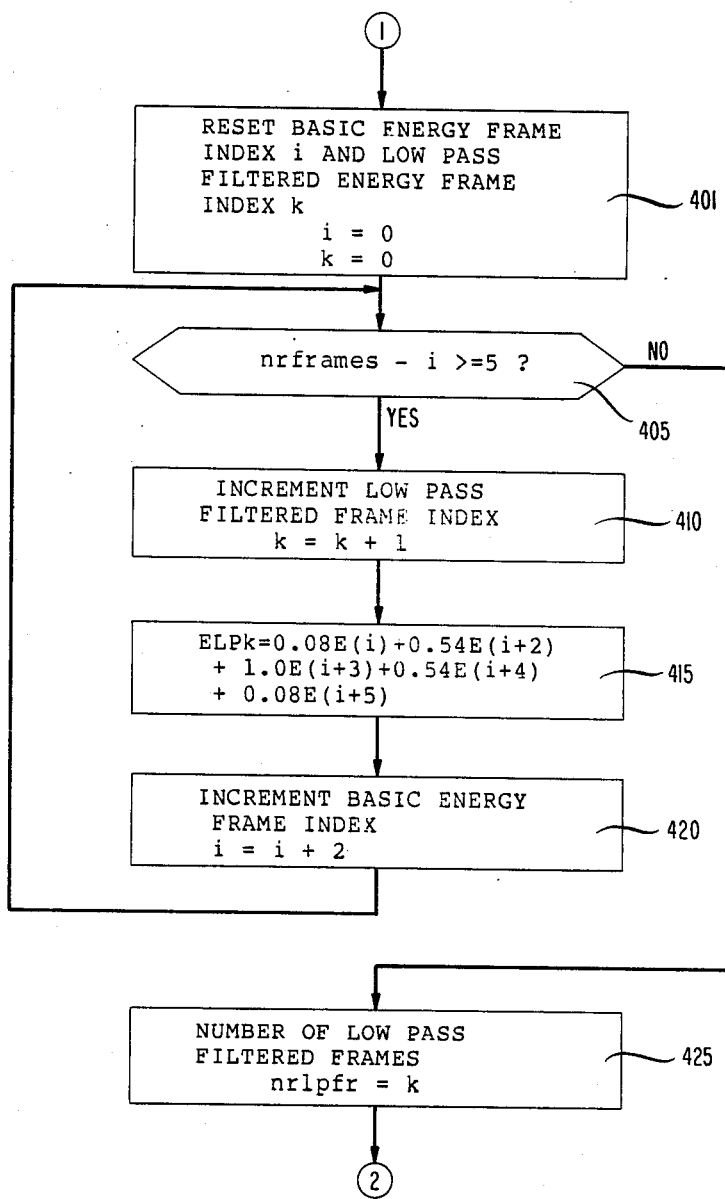

The frame sequence of Ei zeroth order autocorrelation signals correspond to a speech energy profile of the speech pattern received by transducer 101. Higher frequency perturbations in the energy signal sequence, however, interfere with the location of potential syllable maxima and syllable minima frames in the pattern. The Ei signals are therefore processed in processor 120 according to the flowchart of FIG. 4 to generate a severaly low pass filtered speech energy profile. Referring to FIG. 4, the basic energy frame index i and the low pass filtered energy frame index k are reset to zero (box 401). If the number of frames remaining in the speech pattern is greater than or equal to five (box 405), the low pass filtered index k isincremented by one (box 410) and an ELPk signal is produced as per box 415. The basic frame index i is incremented by two in boxy 420 and decision box 405 is reentered. The successive low pass filtered energy signals ELPk are formed in the loop including boxes 405 through 420 until there are less than five basic frames remaining. At this time, a signal nrlpfr corresponding to the number of low pass filtered peaks k generated in oxy 410 is stored.

Figure 5:
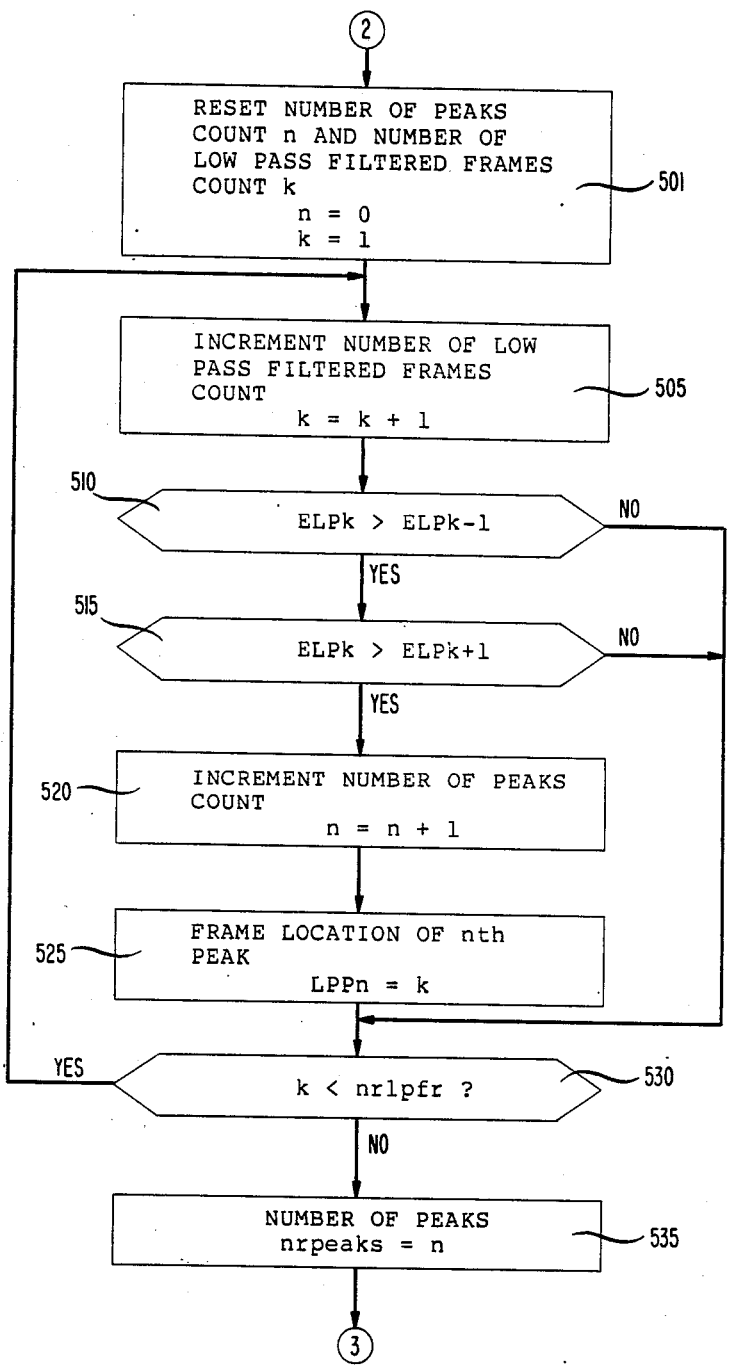

The frame locatons of the peaks of the low pass filtered energy profile are determined in processor 120 operating as shown in the flowchart of FIG. 5. Initially, the peak count index n is reset to zero and the low pass filtered frame count index k is set to one (box 501). The loop including boxes 505 through 530 is then activated to detect each low pass filtered energy frame whose energy signal is greater than the preceding and succeeding low pass filtered frame energy signals. The low pass filtered frame index k is incremented (box 505). The ELPk signal is compared to signals $ELPk-1$ (box 510) and $ELPk+1$ (box 515). If signal ELPk is not greater than signal $ELPk-1$ or $ElPk+1$, the decision box 530 is entered to determine whether all nrlpfr frames have been processed. Where jsignal ELPk is greater than both signals $ELPk-1$ and $ELPk+1$, the peak count index n is incremented by one (box 520) and the frame location of the nth peak LPPn is set to k (box 525). After all frames have been processed, box 535 is activated viabox 530 and the total number of peaks signal nrpeaks is set to the last vaue determined in the loop including boxes 505 through 530.

Figure 6:
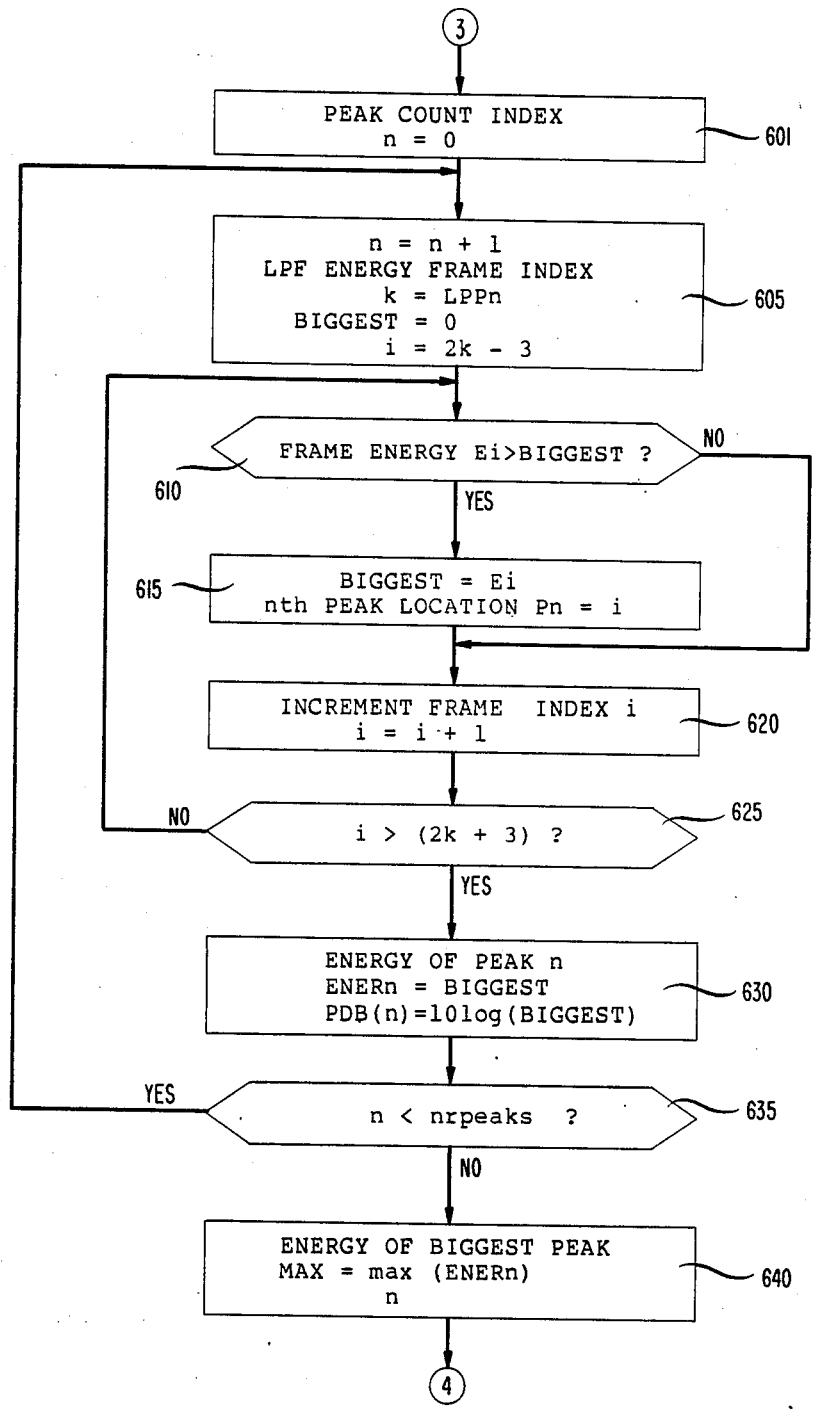

The operations shown in the flowchart of FIG. 6 are then performed in processor 120 to determine the actual peak energy frames Pn of the zeroth order autocorrelation frame sequence and to form a set of signals representative of the peak energies (ENERn and PDB(n)). As indicated in boxes 601 and 605, the peak count index n is reset to zero and incremented to one, the low pass filtered energy frame index k is set to the first peak location LPPn, the BIGGEST reference signal is set to zero and the frame index i is set to $2K-3$. The loop including boxes 610 through 635 is iteratd to determine the frame i in the range between $2k-3$ and $2k+3$ which is the peak energy frame. The speech energy signal corresponding to the current frame is compared to the BIGGEST signal in decision box 610. Where the energy signal Ei is greater than the BIGGEST signal, BIGGEST is replaced by Ei (box 615), the frame location of the peak is stored as signal Pn, and the frame index i is incremented by one in box 620. Otherwise, box 620 is entered directly from box 610 and the BIGGEST signal is unaltered. The energy comparison is continued until the last frame of the range has been processed. The PDB(n) signal for the peak Pn is generated (box 630), and the determination of the next peak energy frame is initiated in box 610 via box 605. The energy peak determination depicted in FIG. 6, are completed when n is equal to or greater than the total number of peaks, nrpeaks as per decision box 635. The energy of the biggest of the peaks is then selected and stored as signal MAX (box 640). With reference to waveform 1401 in FIG. 14, the peak frames occur at points t1, t3, t5, t7, t9, t11, t13, and t15. The maximum peak occurs at t7.

Figure 7:
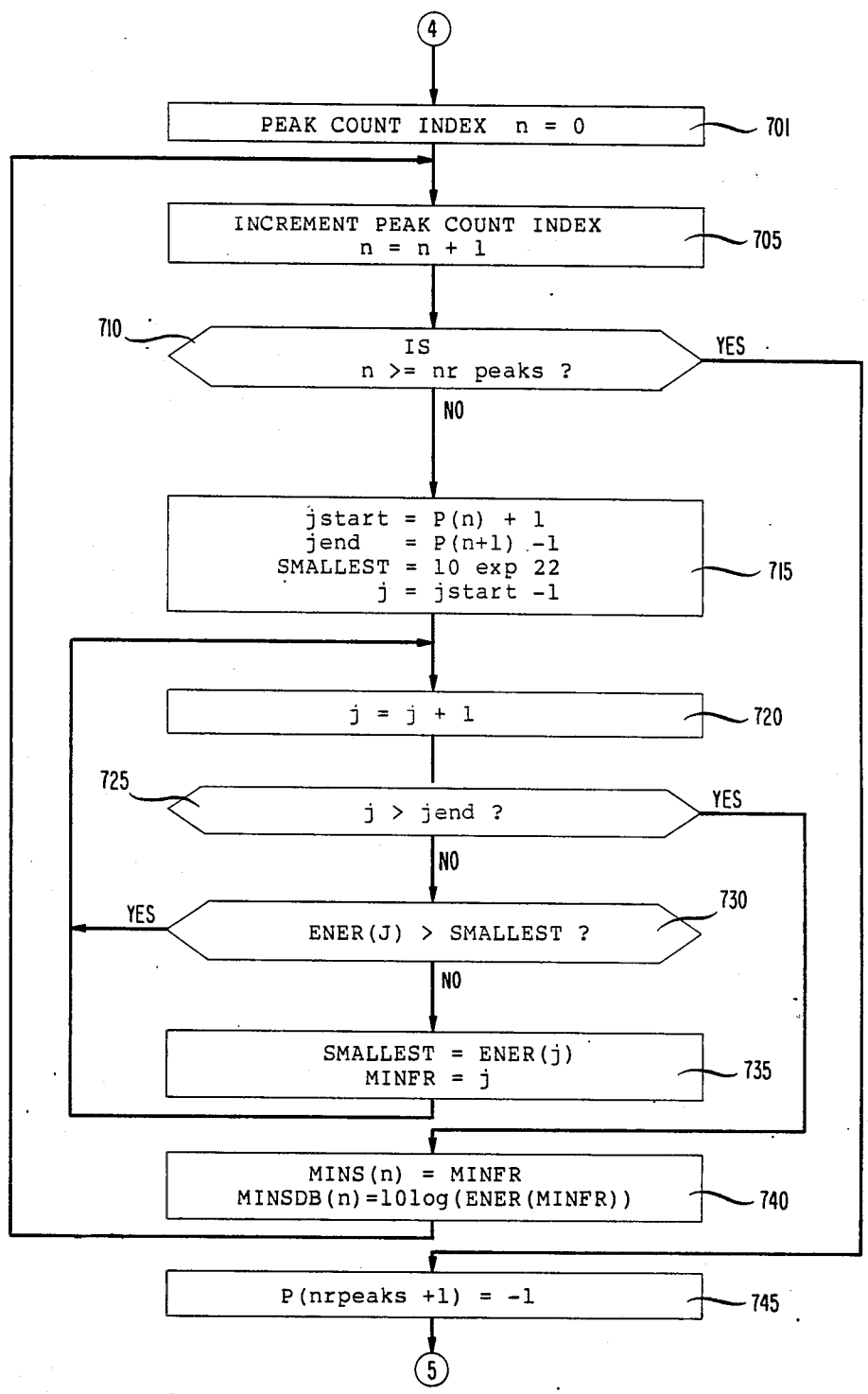

After the peak frame signal sequence is generated and stored in accordance with the flowchart of FIG. 6, a minimum speech energy frame is selected for each pair of successive peak frames in processor 120 as detailed in the flowchart of FIG. 7. This is done by defining a range of frames between two successive peak frames in which the minimum frame can occur and selecting the frame with the smallest speech energy signal. In FIG. 7, the peak coun index n is initially reset to zero (box7 701) and incremented to one (boxy 705). After determining that n is less than the total number of peaks (decision boxy 710), the frame range for the current minimum is set, signal SMALLEST is reset to a large value, and the frame scan index j is reset to the starting frame in the range less one (box 715). The scan frame index j is incremented (box 720) and the current scan frame index is compared to the end scan frame jend (box 725). Until the end frame of the current peak pair is reached, the loop from boxy 720 through 735 is iterated. If the current scan frame energy signal ENER(j) is greater than SMALLEST, boxy 720 is reenterd via decision boxy 730 and the next scan frame is processed. Otherwise, SMALLEST is set equal to ENER(j). MINFR is set equal to the current scan frame j (box 735) and boxy 720 is reentered. When the jend frame is reached, boxy 740 is entered from boxy 725. The minimum frame is stored as signal MINS(n) and the speech energy of the minimum frame ENER(MINFR) is stored as signal MINSBD(n). The minimum frame selection processing for the next successive pair of peak frame is then started in box 705. Upon completion of the final minimum frame selection, control is transferred to box 745 from decision boxy 710 and the peak location frme signal P(nrpeaks+1) is flagged with a −1 signal. As is readily seen from waveform 1401, the processing according to FIG. 7 results in the selection of a minimum energy frame for each peak pair. For example, the frame at t4 is selected as the minimum energy frame between the peak energy frames at t3 and t5.

Figure 8:
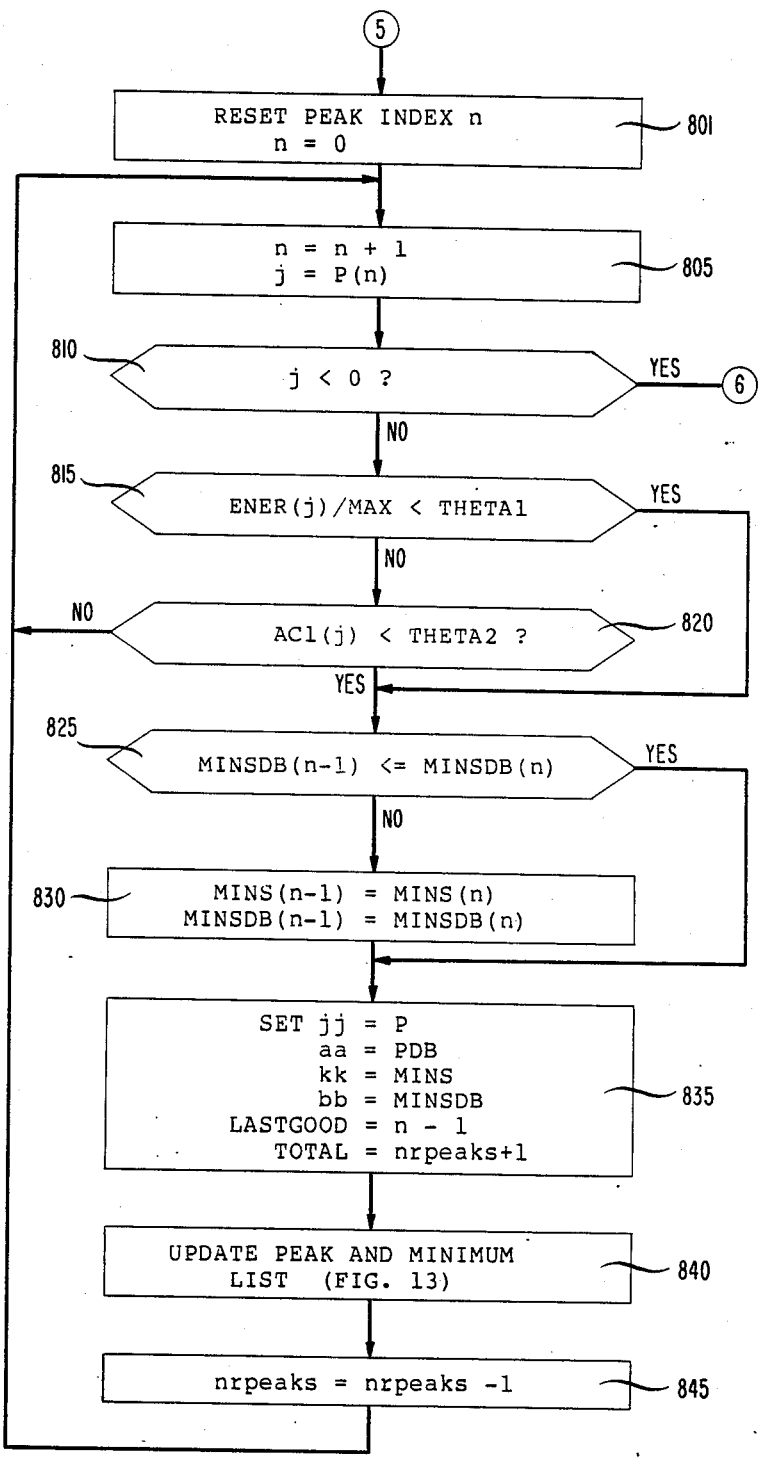

The sequence of peak and minimum speech energy frames obtained from the operations of processor 120 according to the flowcharts of FIGS. 6 and 7 define potential speech pattern syllables. Some of the peak enerby frames, however, are not large enough in relation to the MAX energy frame to define a syllable peak. In waveform 1401 of FIG. 14, for example, the peak t 13 falls too far below the peak at t7 to be considered as the peak of a syllable. Additionally, the occurrence of a peak during a frame in which the normalized first order autocorrelation signal is below a prescribed level is not a potential syllable peak. The peak at t9 in waveform 1401, for example, occurs when the normalized first order autocorrelation signal in waveform 405 is low. Consequently, it should be discarded as syllable peak candidate. Energy peak frames having these characteristics are removed from the peak frame sequence in the processing shown in detail in FIG. 8. With reference to FIG. 8, the peak count index n is initially reset (box 810) and then incremented (box 805). A peak location index j is set to the current peak frame location P(n) (box 8059 and the peak location is compared to zero to determine if the P(nrpeaks+1)=−1 flag has been reached (decision box 810). Until the −1 flag is detected in processor 120, the peak energy frame signals are successively processed according to the loop including boxes 805 through 845 to determine peak frames that do not conform to requirements of boxes 815 and 820 and to eliminate these peak frames and the corresponding minimum frames from the stored peak and minimum frame signal sequences.

The ratio of the current peak frame energy to the maximum peak frame energy (ENER(j)/MAX) is compared to a predetermined threshold theta 1 in boxy 815 and the normalized first order autocorrelation signal AC1(j) is compared to predetermined threshold theta 2 in box 820. If a negative decision is detected for both these characteristics, control is passed to boxy 805 and the next peak energy frame is selected for test. An affirmative decision in either one of these boxes causes decision box 825 to be entered in whicht the speech energy in the adjacent minima frames (MINSDR(n−1) and (MINSDB(n)) are compared. The minimum frame with the lower energy value is retained in the minima frame sequence. Where the preceding minimum energy frame (MINS(n−1)) has the greater energy, the succeeding minimum energy frame number and its energy value are transferred to the preceding minimum energy frame as per boxy 830. The operations of boxes 835 and 840 result in the removal of the nonconforming peak and the greater of the adjacent minima frames from the peak and minima frame sequences. The initial conditions for the change in the sequence signals are set in boxy 835 and the sequence change is accomplished in box 840 which is shown in further detail in FIG. 13.

Figure 13:
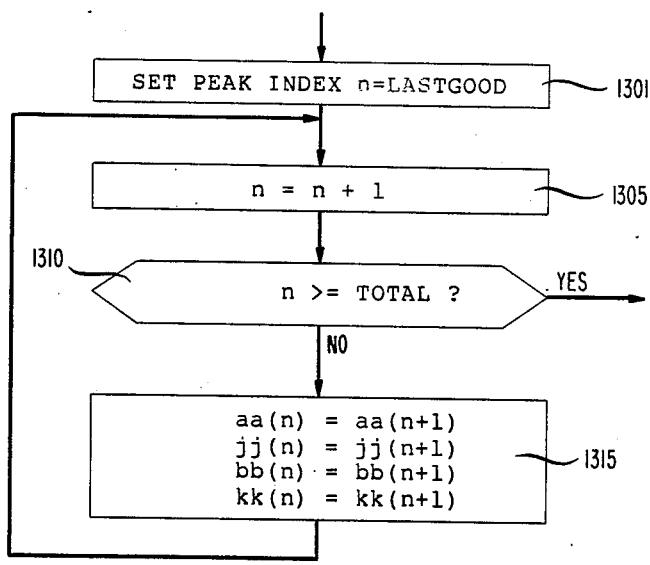
FIGS. 3–13 are detailed flowcharts illustrating the operation of the circuit of FIG. 1.

In the flowchart of FIG. 13, peak index n is set to the peak preceding the peak to be discarded (box 1301) and incremented (box 1305). The loop including boxes 1305 through 1315 is interated until nl32 −nrpeaks+1. In each iteration, the peak and signals for the current peak n are replaced by the peak signals for the succeeding peak n+1. Thus, the peak location signal P(n+1) is substituted for peak location signal P(n) and the minimum location signal MIN(n+1) is substituted for minimum location signal MIN(n). After the n=nrpeak location processing is completed in processor 120, control is returned to box 845 of FIG. 8 in which the totalnumber of peaks is decremented by one.

Figure 9:
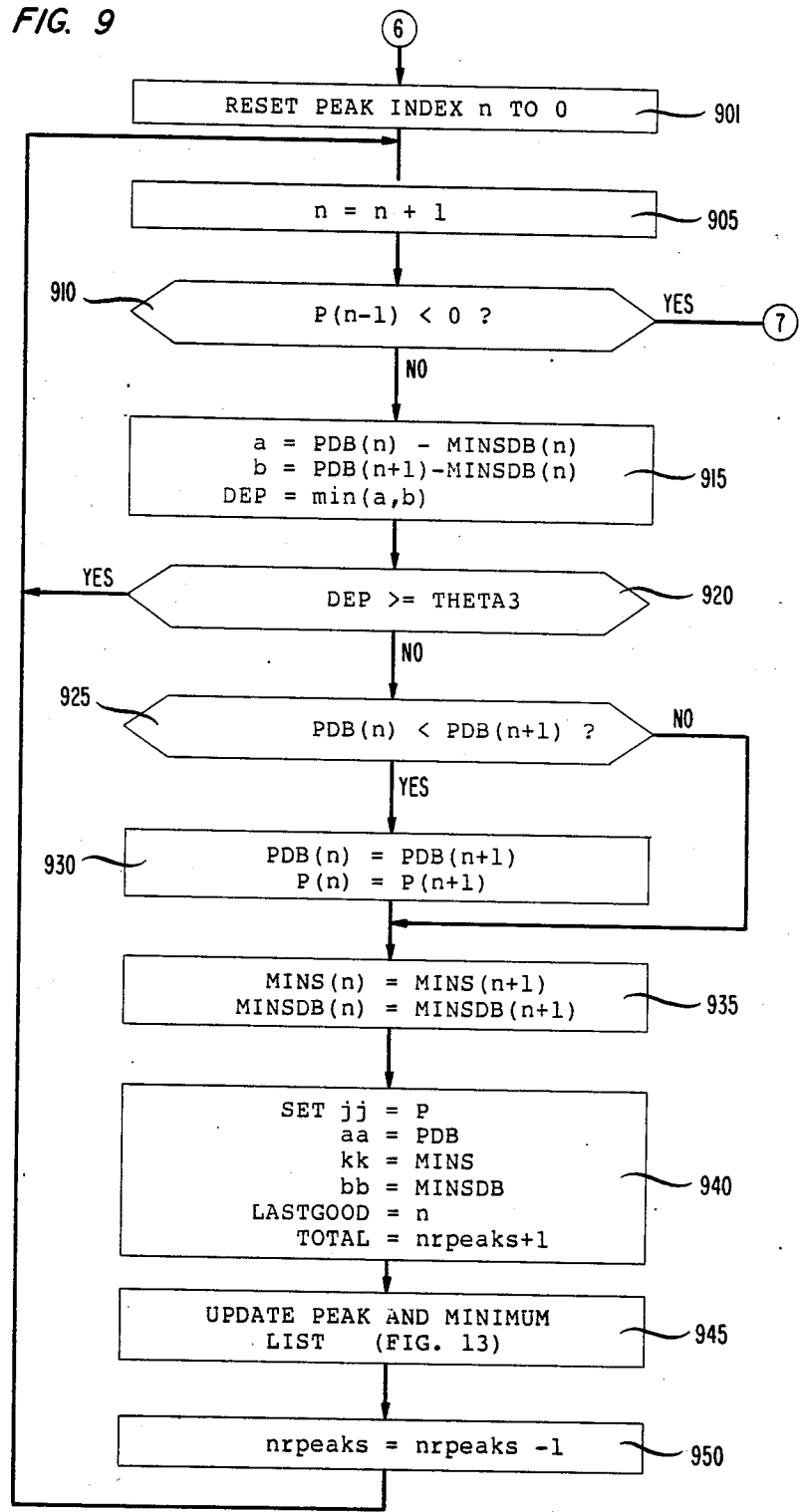

The peak testing operations of FIG. 8 continue until the −1 flag generated in boxy 745 of FIG. 7 is reached and the flowchart of FIG. 9 is entered via decision boxy 810. The operations of FIG. 9 are directed to the elimination of peak and minimum frame pairs having a peak to minimum difference that is insufficient for a syllable candidate. The depth of a minimum in relation to its adjacent peaks is defined as $$DEP = min\{(PDB(n) - MINSDB(n)), (PDB(n+1) - MINSDB(n))\} \qquad (4)$$

The DEP signal is compared to a predetermined threshold theta 3 and the lesser peak as well as the minimum between the two successive peaks is deleted from the peak and minima sequences. In FIG. 9, the peak index n is first reset to zero (box 9019 and then incremented by one (box 905). The loop from box 905 to box 920 is iterated to successively test the depth of peak energy frames P(n) until the current peak location is the −1 flag generated in box 745 of FIG. 7 (box 910). The depth signal of equation (4) is formed for the current peak index n (box 915) and compared to threshold signal theta 3 (box 920). In the event the depth signal equals or exceeds theta 3, box 905 is reentered for the next interation. Otherwise, peak and minimum removal operations of the set of boxes from box 925 to box 950 are performed in processor 120.

The successive peak energy signals PDB(n) and PDB(n+1) are compared as per decision box 925. If signal PDB(n) is smaller, its value is replaced by the vaue of signal PDB(n+1) or box 930 and boxy 935 is entered. Where the PDB(n+1) signal is smaller, box 935 is entered directly from decision box 925. The minimum location signal MINS(n) is replaced by the succeeding minimum location signal MINS(n+1) and the minimum energy signal MINSDB(n) is replaced by minimum energy signal MINSDB(n+1) in processor 120 as per box 935. The sequences of peak and minimum energy frames are modified to eliminate the depth nonconforming peak and minimum frames in boxes 940 and 945. The frame removal operations are substantially similar to those described with respect to FIG. 8 except that of the first frame process starts with peak n+1 and includes peak n=nrpeak. The number of peaks is then decremented by one (box 950) and the depth testing loop is reentered via (box 905).

At this point in the operation of the circuit of FIG. 1, the sequence of peak energy frames and minimum energy frames in store 135 identify candidate syllables of the speech pattern. Predetermined characteristics of the syllable candidates are generated in accordance with the flowcharts of FIGS. 10 and 11. These characteristics are evaluated by the operations shown in FIG. 12 to select and identify the sequence of syllables in the speech pattern for use in utilization device 165 which may be a speech analyzer or speech recognizer. The characteristics that are utilized include the peak difference function defined as $$E_{diff} = E(n) - [E(n-1) + E(n+1)]/2 \quad (5)$$

where n is the peak number, and E(n) is the speech energyof the nth peak. This characteristic indicates the deviation from the local average speech energy. A second characteristic is the magnitude of the speech energy of a peak relative to the magnitude of the maximum peak energy defined as $$DBD = 10 \log (MAX) = PDB(n) \quad (5)$$

where PDB(n) is the speech energy in the peak frame in decibels. A third characteristics relates to the duration of the syllable. These characteristics are combined with weighting factors to form a figure of merit for the syllable identified by the peak number n $$G = MYSLYDUR(n) + \text{theta } 5*DIFF(n) + \text{theta } 6*DBD(n). \quad (7)$$

Syllable candidates having a figure of merit G less than a predetermined threshold theta 7 are accepted as syllables of the speech pattern.

Figure 10:
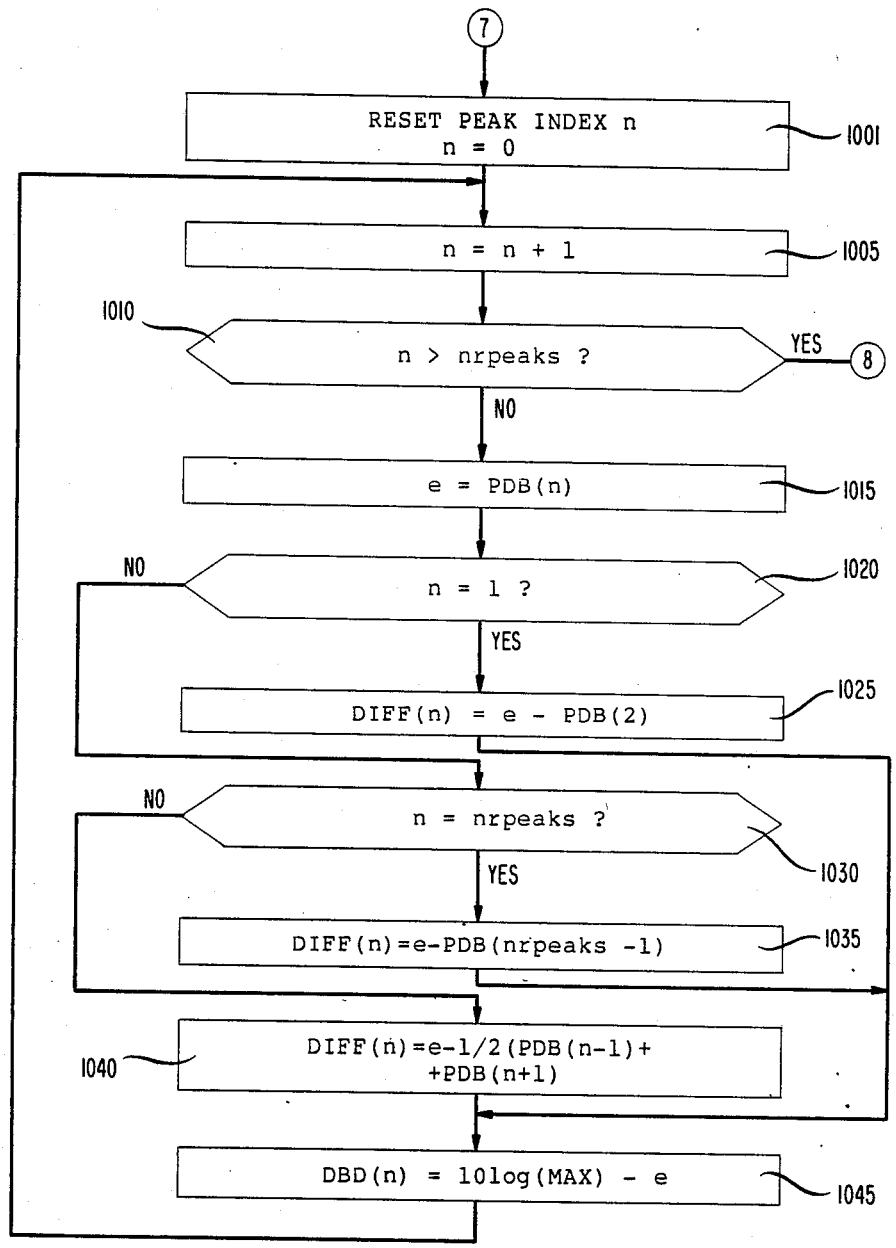

The flowchart of FIG. 10 shows in detail the operation sequence of processor 120 for generating the difference signal of equation (5) and the DBD signal of equation (6). Referring to FIG. 10, the peak index n is reset to zero (box 1011) prior to iterating the loop including boxes 1005 through 1045 for the successive peak of the speech energy pattern. The peak index is incremented by one (box 1005) and the new index value is compared to nrpeaks in decision box 1010 to determine if all peaks have been processed in processor 120. Until n is incremented to nrpeaks+1, the PDB(n) signal is stored as signal e (box 1015). If the current peak is the first peak, signal DIFF(1) is set as per box 1025 via decision box 1020 and signal DBD is generated in accordance with box 1045. Otherwise the peak index is compared to the last peak (nrpeaks) and set as per box 1035 if it is the last peak. This is done via decision box 1030. Where 1<n<nrpeaks, the DIFF signal is generated according to box 1040. In either case, the DBD(n) signal is formed in box 1045 and box 1005 is reentered for the next peak frame processing.

Figure 11:
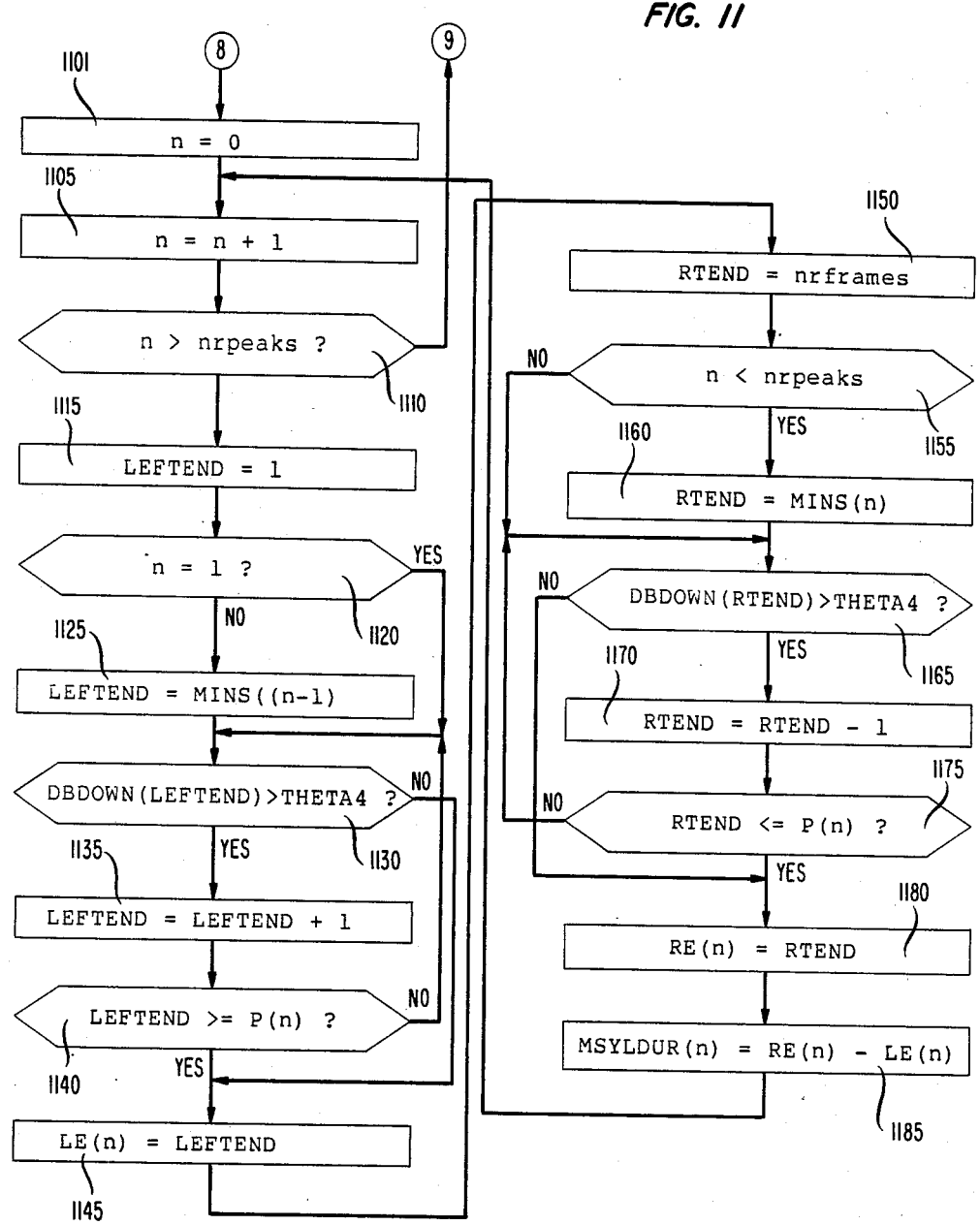

After the DIFF and DBD signals for the peak frame sequence are formed, box 1101 of FIG. 11 is activated and the peak index n is reset to zero. FIG. 11 illustrates the operation of processor 120 in determining the left and right end frames of the syllable candidates in the input speech pattern. These end frames are then utilized to obtain a measure of the syllable durations. The left end frame for the current peak LE(n) is generated according to boxes 1115 through 1145 and the right end frame for the current peak is generated as per boxes 1150 through 1185. The peak frame index n is incremented in box 1105 and compared to the total number of peaks (nrpeaks) in decision box 1110. Until the last energy peak has been processed, LEFTEND signal is reset to one (box 1115) and decision box 1120 is entered. If n>1, the LEFTEND speech pattern frame signal is set to MINS(n−1) is box 1125 and the loop including boxes 1130 through 1140 is iterated. Otherwise, LEFTEND remains at one and the loop is activated directly from decision box 1120. For each successive frame of the speech pattern from LEFTEND until the next peak energy frame, the DBD(LEFTEND) signal is tested against a threshold theta 4 which corresponds to the lowest level of a syllable interval (box 1130). LEFTEND frame index is incremented until the threshold condition of box 1130 is met or the LEFTEND frame is the same or greater than the peak frame P(n). The current LE(n) signal is then set to LEFTEND (box 1145).

The right end frame RE(n) processing is then started by setting signal RTEND to the last speech pattern frame nrframes (box 1150). If the current peak index n is the last peak nrpeaks, the loop including boxes 1165 through 1175 is entered directly via dicision box 1155. Otherwise, the right end frame index signal is set to MINS(n) in box 1160 before entering this loop. In the right end frame determining loop, the DBD(RTEND) is compared to threshold signal theta 4 (box 1165). The RTEND frame signal is decremented by one in box 1170 and the decremented signal is compared to the current peak frame (box 1175). When either the signal DBD becomes less than theta 4 or signal RTEND reaches the current peak frame P(n), the loop is exited and the right end signal RE(n) is set to RTEND (box 1180). The current syllable duration measure MSYLDUR(n) is then set to the frame difference between the determined right end and left end frames (box 1185) for the current peak and processing of the next peak is initiated in box 1105.

Figure 12:
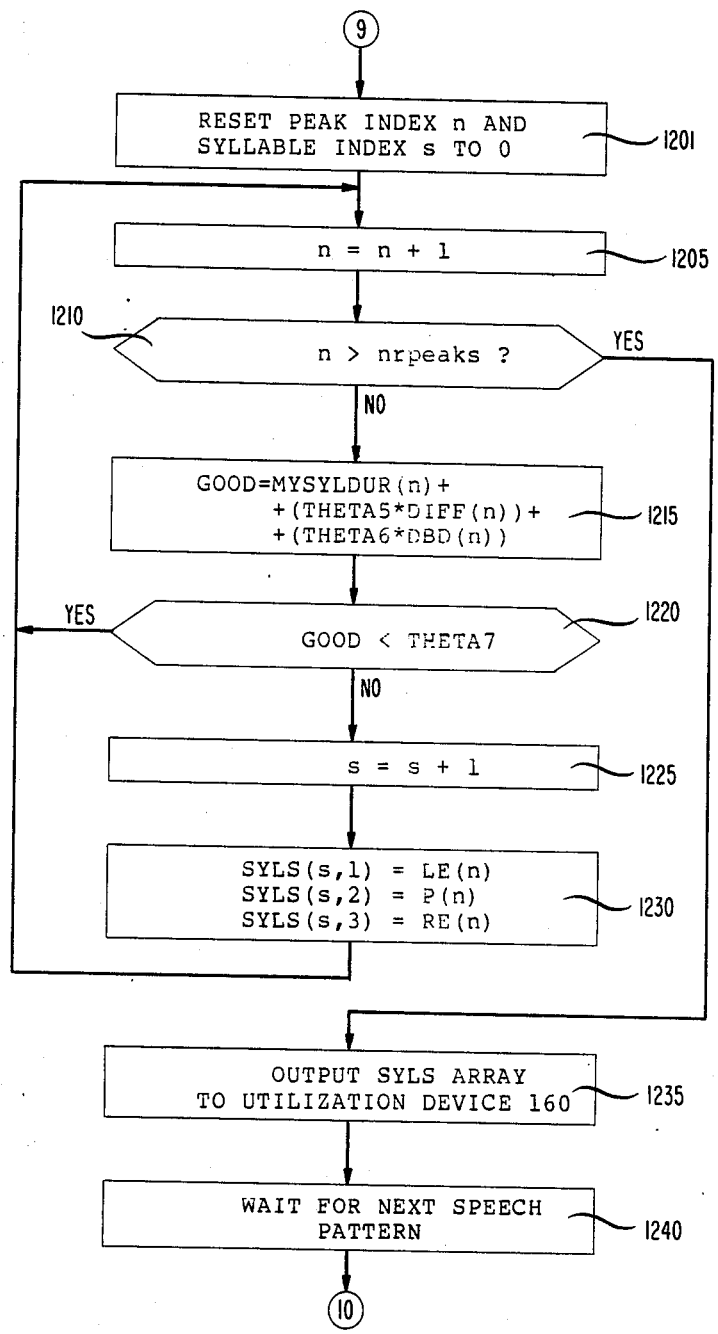

The syllable sequence for the speech pattern is selected from the candidate syllables in accordance with the flowchart of FIG. 12. This is done on the basis of the figure of merit of equation (7). The peak energy frame index n and the syllable index s are reset to zero as per box 1201 and the peak energy frame index is incremented by one in box 1205. The syllable candidates are successively tested using the figure of merit equation in the loop from box 1205 through 1220. After the current peak index n is compared to the total number of peaks in box 1210, signal GOOD is formed for the current syllable candidate n. When a candidate syllable GOOD signal exceeds a predetermined threshold theta 7 in box 1220, the syllable index s is incremented by one (box 1225) and the array of SYLS syllable defining signals are set in box 1230. These signals include the left end and right end boundary frames and the peak frame. Whether or not the candidate syllable is accepted in box 1220, control is passed to incrementing box 1205 and the next syllable condidate is evaluated in processor 120. Upon completion of the n=nrpeaks syllable processing, the syllable array is transferred to utilization device 160 via interface 150 and the circuit of FIG. 1 is placed in its wait state until another speech pattern is detected (box 1240).

FIG. 12 illustrated the formation of syllable identification signals, the arrangement may be readily modified to form signals identifying demisyllables. In a demisyllable partitioning, the frame interval between an endframe (left or right) and the intermediate peak is identified for use in utilization device 160. As is well known is the art, demisyllable partitioning can result in more efficient speech analysis.

The invention has been shown and described with reference to a particular embodiment thereof. It is to be understood, however, that various modifications and changes may be made by those skilled in the art without departing from the spirit and scope of the invention.

APPENDIX

```
C   MAIN
        parameter (nfmx=500)
        dimension ac0(nfmx)
        dimension ac1(nfmx)
        dimension syls(nfmx/5)
        dimension msyldur(nfmx/5)

C       get speech and perform autocorrelation analysis:
10      call getac(ac0,ac1,nfmx,nfrt)

C       normalize 1st a.c. coeff.:
        do 20 i=1,nfrt
          ac1(i) = ac1(i)/ac0(i)
20      continue call ftsr(ac0,ac1,nfrt,syls,msyldur,nrgood)
C       (output syls, msyldur, nrgood)
        call out(syls, msyldur, nrgood)

goto 10 end

C  subr SLPF
C        severely  IPF an input file by means of Hamming windowing subroutine slpf(x,y,nxfr,nyfr,nterp,lpfwid)

dimension x(1), y(1)

C       x - input array
C       y - output array
C       nxfr - nr of x frames being input
C       nyfr - nr of y frames being returned
C              nyfr =approx nxfr/nterp
C       nterp - ratio btn x and y sample rates
C       lpfwid - width of Hamming window used in subr dimension win(100)      !for hamming window
                                !100 = max poss lpfwid
        logical isensw if(.not.isensw(0))  goto 30

30      call cham(win,lpfwid)
```

```
nyfr = 0           !count output (lpf'd) frames
lastart = nxfr-lpfwid+1
do 200   issp = 1,lastart,nterp nyfr = nyfr+1
         yy = 0.
         winsum = 0.       !for scaling
         do 300   i=1,lpfwid
          n = issp+i-1
          yy = yy + win(i)*x(n)
          winsum = winsum + win(i)
300      continue y(nyfr) = yy/winsum
200      continue return

END

C       SMINMX--ROUTINE TO FIND MINIMUM AND MAXIMUM OF AN ARRAY
        SUBROUTINE SMINMX(AR,N,YMIN,YMAX)
        common/ smindex / inmin, inmax
        DIMENSION AR(*)
        YMIN=1.E70
        YMAX=-YMIN
        DO 10 I=1,N
        if( ar(i) .lt. ymin ) then
                ymin = ar(i)
                inmin = i
        endif
        if( ar(i) .gt. ymax ) then
                ymax = ar(i)
                inmax = i
        end if
 10     CONTINUE
        RETURN
        END C   IZERO
C   ZERO AN INTEGER ARRAY OF SIZE N
        SUBROUTINE IZERO(IA,N)
        DIMENSION IA(*)
        integer * 4 n4, n4t, i4
C
        n4 = n
        go to 1
C
C   alternate entry for i*4 n
C
        ENTRY izero_ (ia, n4t)
        n4 = n4t
C
1       DO 10 i4 = 1, n4
            IA(i4)=0

10      CONTINUE
        RETURN
        END
```

```
C CHAM- CREATES HAMMING WINDOW ROUTINE
      SUBROUTINE CHAM(WIN,N)
      DIMENSION WIN(1)
      PI=4.*ATAN(1.0)
      DO 10 I=1,N
   10 WIN(I)=0.54-0.46*COS((2.*PI*(I-1))/(N-1))
      RETURN
      END subroutine closeranks(jj,aa,kk,bb,nlg,ntot)

dimension jj(1)
      dimension aa(1)
      dimension kk(1)
      dimension bb(1)
      logical isensw C     nlg  - nr of last good frame
C     ntot - total nr of frames in each array before
C     discard frame do 100  i=nlg+1,ntot-1
       aa(i) = aa(i+1)
       jj(i) = jj(i+1)
       bb(i) = bb(i+1)
       kk(i) = kk(i+1)
  100 continue end SUBROUTINE GETAC(ac0,ac1,nfmx,nfrt)
C       do ac anal of speech in array ispch;
C       write results in arrays ac0, ac1;
C       nfmx: max allowable nr frames;
C       nfrt: returned nr of frames parameter (nsamps=32000)
      dimension ac0(nfmx)
      dimension ac1(nfmx)
      dimension ispch(nsamps)
      DIMENSION HAM(300),X(300)
      dimension buf(300)
      common/ces/mwidth
      conv  = 10          !start conv code
      convs = 11          !read status code
      convd = 12          !read data code do 50  j=1,nsamps
       call output(conv,1)
   25  call input(convs,i)
        if(i.ne.1) goto 25              !not ready
       call input(convd,ispch(j))       !ready: get sample
   50 continue ishft = 100
      mwidth = 300
      shft = float(ishft)

ilast = (nsamps-mwidth)/shft
      i1 = 1
      i2 = ilast
      nfrt = i2-i1+1
```

```
         call CHAM(HAM,mwidth)

do 200  i=i1,i2          !do for each frame
           j0 = (i-1)*shft
           do 110  j=1,mwidth
110          buf(j) = ham(j)*ispch(j0+j)
           ac0(i) = 0.
           ac1(i) = 0.
           do 130  j=1,mwidth-1
             ac0(i) = ac0(i) + buf(j)*buf(j)
             ac1(i) = ac1(i) + buf(j)*buf(j+1)
130        continue
           ac0(i) = ac0(i) + buf(mwidth)*buf(mwidth)
200      continue

RETURN
         END

C     accept egy(), energy value for each frame,
C     nac1(), normalized 1st a.c. value for each frame,
C     and
C     nn, total nr of frames;

C     return syls(), the left end, peak, and right end
C     frame nrs
C     of each true syl (left and right ends are of
C     above-thresh
C     portions of syls), msyldur(), the mod'd syl
C     durations
C     and nrgood, the nr of syls subroutine ftsr(egy,nac1,nn,syls,msyldur,nrgood)

parameter (maxnrfr = 500)
         parameter (mnfo5 = maxnrfr/5)
         parameter (downthr = 20.)          !accept no peak >
                                            !20 db down
         parameter (nac1thr = 0.)           !limit acceptable
                                            !nac1
         parameter (depthr = 1.6)           !min valley depth
                                            !=1.6 db
         parameter (adf = 0.52)             !diff coeff
         parameter (add = 0.32)             !dbd coeff dimension egy(maxnrfr)
         dimension dbdown(maxnrfr)          !db down frm max
                                            !for utterance
         dimension elp(maxnrfr)

dimension peaksdb(mnfo5)           !energy-db of peak
                                            !frames
         dimension aminsdb(mnfo5)           !egy db in valleys
         dimension diff(mnfo5)              !db diff btn peaks
         dimension dbd(mnfo5)               !db down for peaks
         integer lpeaks(mnfo5)              !ditto, but by
                                            !severe LP-
                                            !analysis integer peaks(mnfo5)               !list of energy-
                                            !peak frames
         integer mins(mnfo5)                !locs of mins btn
                                            !first-pass peaks
         integer msyldur(mnfo5)             !mod syl dur for
                                            !ea peak
```

```
            integer leftend(mnfo5)              !leftmost frame of
                                                !syl above thresh
            integer rightend(mnfo5)             !rightmost frame
                                                !of syl above
                                                !thresh
            integer syls(mnfo5,3)
            logical isensw C       *** compute db down for each frame call sminmx(egy,nn,unnec,egymax)
            emdb = 10.*alog10(egymax+.01)
            do 240  n=1,nn
             db = 10.*alog10(egy(n)+.01)
             dbdown(n) = emdb - db
240         continue nterp = 2               !default
            llpfwid = 5             !default 30          silthr = 30.            !silence threshold 40          gthresh = 7.2    !dflt value of goodness thresh C       *** create severely LPF'd energy rep:

120         call slpf(egy,elp,nn,nl,nterp,llpfwid)
C           (egy in, egy out, nr frames in, nr out, interp ratio
C            filt width)

C       *** FIND LOCAL MAXIMA IN SEVERELY LPF'D ENERGY:

call izero(peaks,mnfo5)
            call izero(lpeaks,mnfo5)
            maxctr = 0      !nr max's so far found
            if(elp(1).gt.elp(2) .and. elp(2).gt.elp(3))  then
              maxctr = 1
              lpeaks(1) = 1
              endif
            do 320  n=2,nl-1
             if(elp(n-1).ge.elp(n) .or. elp(n+1).gt.elp(n))
                   goto 320
             maxctr = maxctr+1
             lpeaks(maxctr) = n
320         continue nrmaxs = maxctr C       *** locate peaks more precisely by ref to mod'ly LPF'd signa do 500  i=1,nrmaxs
             midframe = nterp*lpeaks(i) + 1
             j1 = max0(1,midframe-2)
             j2 = min0(midframe+2,nn)
             biggest = 0.
             do 540  j=j1,j2
               if(egy(j).lt.biggest)  goto 540
               biggest = egy(j)
               maxfr = j
540          continue
             peaks(i) = maxfr
             peaksdb(i) = 10.*alog10(egy(maxfr)+1)
500         continue call sminmx(peaksdb,nrmaxs,unnec,utmaxdb)        !find max eg
```

C       *** FIND MINIMA if(nrmaxs.lt.2) goto 900          !only 1 peak: no
                                          !mins
        do 600  i=1,nrmaxs-1
         jstart = peaks(i) + 1
         jend = peaks(i+1) - 1
         if(jstart.ge.jend)  then
           minfr = peaks(i)
           goto 660
           end if
         smallest = 1.e22
          do 640  j = jstart,jend
           if(egy(j).gt.smallest)  goto 640
           smallest = egy(j)
           minfr = j
640        continue
660       mins(i) = minfr
          aminsdb(i) = 10.*alog10(egy(minfr)+.01)
600      continue C       *** THROW OUT ALL PEAKS > downthr DB DOWN peaks(nrmaxs+1) = -9     !eof marker
        m = 0
700     m = m+1
        j = peaks(m)                      !frame nr of m'th peak
        if(j.le.0)  goto 800      !eof
        if(dbdown(j).ge.downthr)  goto 710      !ng
        if(nac1(j).lt.nac1thr)  goto 700        !dbdown ok
                                                !and nac1 of too
C       peak below thresh - delete it:
710     if(m.eq.1) goto 740
        if(aminsdb(m-1).le.aminsdb(m))  goto 740
         mins(m-1) = mins(m)
         aminsdb(m-1) = aminsdb(m)
740     call closeranks(peaks,peaksdb,mins,aminsdb,m-1,nrmaxs+1)
        nrmaxs = nrmaxs - 1               !hv lost a frame - decr nrma
        goto 700

C       *** CHECK FOR INSUFFICIENT VALLEY DEPTH 800     continue
        m = 0
810     m = m+1
        if(peaks(m+1).lt.0)  goto 900     !we at last peak -
                                          !no val follows
        a = peaksdb(m) - aminsdb(m)
        b = peaksdb(m+1) - aminsdb(m)
        dep = amin1(a,b)
        if(dep.ge.depthr)  goto 810                !ok
C       depth insufficient - combine peaks m and m+1 into new m:
        if(peaksdb(m).lt.peaksdb(m+1))  then
           peaks(m) = peaks(m+1)
           peaksdb(m) = peaksdb(m+1)
           end if
        mins(m) = mins(m+1)
        aminsdb(m) = aminsdb(m+1)
        call closeranks(peaks,peaksdb,mins,aminsdb,m,nrmaxs+1)
        nrmaxs = nrmaxs - 1               !hv lost a frame -
                                          !decr nrmaxs
        goto 810

```
C       *** CREATE DIFF AND DBD ARRAYS 900     do 920  i = 1,nrmaxs
          egi = peaksdb(i)
          if(i.eq.1) then
            diff(i) = egi - peaksdb(2)
          else if(i.eq.nrmaxs) then
            diff(i) = egi - peaksdb(nrmaxs-1)
          else
diff(i) = egi - 0.5*(peaksdb(i-1) + peaksdb(i+1))
          end if dbd(i) = emdb - egi 920     continue

C       *** DERIVE MOD SYL DURS do 1300  i=1,nrmaxs

C       first find left end of above-thresh portion:
        lend = 1
        if(i.ne.1)  lend = mins(i-1)
1310    if(dbdown(lend).gt.silthr) then           !below thresh
          lend = lend + 1                         !try next
                                                  !frame to
                                                  !right
          if(lend.ge.peaks(i))  goto 1320         !whole syl
                                                  !is below
                                                  !thresh
          goto 1310
        end if 1320    leftend(i) = lend         !write away lt end, start
                                  !lkg for rt end
        irend = nn
        if(i.lt.nrmaxs)  irend = mins(i)
1330    if(dbdown(irend).gt.silthr) then          !below thresh
          irend = irend - 1                       !try
                                                  !preceding frame
          if(irend.le.peaks(i))  goto 1340        !whole syl
                                                  !is below thresh
          goto 1330
        end if 1340    rightend(i) = irend
        msyldur(i) = irend - lend 1300    continue C       *** ferret out artifacts:

n = 0              !nr peaks so far found passing goodness test
        do 1400  i = 1,nrmaxs
          d = msyldur(i)
          good = d + adf*diff(i) - add*dbd(i)
          if(good.lt.gthresh)  goto 1400          !no good
C       peak ok - incr syl counter and write to final array:
          n = n+1
          syls(n,1) = leftend(i)
          syls(n,2) = peaks(i)
          syls(n,3) = rightend(i)
```

```
                msyldur(n) = d + 1    !overwrite msyldur array
1400        continue nrgood = n
            return           !return syls(), msyldur(), nrgood
            Subroutine cut (syls, msyldur, nrgood)
            dimension syls (1)
            dimension msyldur (1)
C           output results
C           assume an output status register (read)
C           and an output data register (write)

HSTAT = 20
            HDATA = 21 do 100 J = 1,nrgood 75          call input (20,I)
            if (I.NE.1) go to 75
            call output (21,syls(J))

100         continue
            do 200 J = 1,nrgood 175         call input (20,I)
            if (I.NE.1) go to 175
            call output (21, msyldur (J))

200         continue 300         call input (20,I)
            if (I.NE.1) go to 300
            call output (21, nrgood)

RETURN
            END
```

What is claimed is:

1. Apparatus for partitioning a speech pattern into syllabic subunits comprising:

means for generating a frame sequence of autocorrelation signals corresponding to said speech pattern;

means responsive to said autocorrelation signal sequence for forming a sequence of signals representative of speech energy in the successive frames of the speech pattern;

means responsive to said speech pattern energy signals for generating a sequence of speech pattern peak energy frame signals;

means responsive to said speech energy signals sequence and said peak frame signal sequence for generating a signal representative of the minimum speech energy frame between each pair of successive peak energy frames;

means responsive to said peak and minimum energy frame signals and said autocorrelation signals for producing a sequence of candidate peak and minimum energy signals;

means responsive to said candidate peak and minimum energy frame signal sequences for forming a set of candidate syllabic subunit characteristic signals; and means responsive to said candidate syllabic subunit characteristic signals for selecting a set of speech pattern syllabic subunits.

2. A method for partitioning a speech pattern into syllabic subunits comprising the steps of:

generating a frame sequence of autocorrelation signals responsive to said speech pattern;

forming a sequence of signals representative of the speech energy in successive frames of the speech pattern responsive to said frame sequence of autocorrelation signals;

generating a sequence of signals representative of the speech pattern peak energy frames responsive to said speech pattern energy signals;

generating a signal representative of the minimum speech energy frame between each pair of successive peak energy frames responsive to said speech energy signal sequence and said peak energy frame signal sequence;

producing a sequence of candidate syllabic subunit signals responsive to said peak and minimum energy frame signals and said autocorrelation signals;

forming a first signal representative of the speech energy of each candidate syllabic subunit peak energy frame relative to the speech energy of the adjacent candidate syllabic subunit peak energy frames responsive to the said peak and minimum energy frame signals;

forming a second signal representative of the energy of each candidate syllabic subunit peak energy frame relative to the energy of the maximum speech energy frame responsive to the said peak and minimum energy frame signals;

forming a third signal representative of the duration of each candidate syllabic responsive to the said peak and minimum energy frame signals;

combining said first, second and third signals of each candidate syllabic subunit to form a signal corresponding to a figure of merit for said syllabic subunit; and selecting a sequence of speech pattern syllabic subunits responsive to said candidate syllabic subunit figure of merit signals.

3. A method for partitioning a speech pattern into syllabic subunits according to claim 2 wherein:

said autocorrelation signal sequence generating step comprises forming a frame sequence of zeroth order autocorrelation signals;

said speech energy signal sequence formation comprises generating a sequence of speech energy representative signals responsive to said zeroth order autocorrelation signals; and said peak energy frame signal sequence generating step comprises low pass filtering said frame sequence of speech energy signals, determining peak low pass filtered speech energy signals, and selecting speech energy signal frames corresponding to said determined peak low pass filtered speech energy signals jointly responsive to said peak low pass filtered energy signals and said energy signal sequence.

4. A method for partitioning a speech pattern into syllabic subunits according to claim 3 wherein said said step of generating said frame sequence of autocorrelation signals comprises forming a sequence of first order autocorrelation signals responsive to said speech pattern.

5. A method for partitioning a speech pattern into syllabic subunits according to claim 4 wherein:

said candidate syllabic unit signal producing step comprises selecting candidate peak and minimum energy frames jointly responsive to said peak energy signals, said minimum energy signals and said first order autocorrelation signals.

6. A method for partitioning a speech pattern into syllabic subunits according to claim 5 wherein:

said first signal forming step comprises generating for each candidate syllabic subunit a signal representative of the difference between the speech energy of each candidate peak energy frame and the average speech energy of the preceding and succeeding candidate peak energy frames responsive to the said peak and minimum energy frame signals;

said second signal forming step comprises generating a signal representative of the difference between the energy of each candidate peak energy frame and the energy of the maximum speech energy frame responsive to the said peak and minimum energy frame signals; and said third signal forming step comprises generating a signal representative of the duration of each syllabic subunit responsive to the candidate syllabic subunit peak energy frame and the adjacent minimum energy frames.

7. A method for partitioning a speech pattern into syllabic subunits according to claim 6 wherein combining said first, second and third signals to form a figure of merit signal for each candidate syllabic subunit comprises summing signals proportional to said first, second and third signals.

8. A method for partitioning a speech pattern into syllabic subunits according to claims 2, 3, 4, 5, 6, or 7 wherein said syllabic subunits are syllables.

9. A method for partitioning a speech pattern into syllabic subunits according to claims 2, 3, 4, 5, 6, or 7 wherein said syllabic subunits are demisyllables.

10. Apparatus for partitioning a speech pattern into syllabic intervals according to claim 1 wherein:

said means for forming a frame sequence of autocorrelation signals corresponding to the speech pattern comprises means for forming a frame sequence of zeroth order autocorrelation signals and a frame sequence of first order autocorrelation signals;

said means for generating a frame sequence of speech energy signals comprises means responsive to said zeroth order autocorrelation signals for generating speech energy signals;

said candidate peak and minimum energy signal producing means comprises means responsive to said peak energy frame signal sequence and said first order autocorrelation signal sequence for producing a sequence of candidate peak and minimum signals.

11. A method for partitioning a speech pattern into syllabic subunits comprising the steps of:

generating a frame sequence of zeroth order autocorrelation signals and a frame sequence of first order autocorrelation signals corresponding to said speech pattern;

forming a sequence of signals representative of speech energy in the successive frames of the speech pattern responsive to said zeroth order autocorrelation signal sequence;

generating a sequence of speech pattern peak energy frame signals responsive to said speech pattern energy signals;

generating a signal representative of the minimum speech energy frame between each pair of successive peak energy frames responsive to said speech energy signals sequence and said peak energy frame signal sequence;

producing a sequence of candidate peak and minimum energy signals responsive to said peak energy frame signal sequence, minimum energy frame signal sequence and said first order autocorrelation signal sequence;

forming a set of candidate syllabic subunit characteristic signals including forming a first signal representative of the speech energy of each candidate syllabic subunit peak energy frame relative to the speech energy of the adjacent candidate syllabic subunit peak energy frames responsive to the said peak and minimum energy frame signals, forming a second signal representative of the energy of each candidate syllabic subunit peak energy frame relative to the energy of the maximum speech energy frame response to the said peak and minimum energy frame signals, and forming a third signal representative of the duration of each candidate syllabic subunit responsive to the said peak and minimum energy frame signals;

combining said first, second and third signals of each candidate syllabic subunit to form a signal corresponding to a figure of merit for said candidate syllabic subunit; and selecting a sequence of speech pattern syllabic subunits responsive to said candidate syllabic subunit figure of merit signals.

12. A method for partitioning a speech pattern into syllabic subunits according to claim 11 wherein said peak energy frame signal sequence generating step comprises low pass filtering said frame sequence of speech energy signals, determining the peak filtered energy frame signals, and selecting speech energy frames corresponding to said determined peak low pass filtered frames.

13. A method for partitioning a speech pattern into syllabic subunits according to claim 11 wherein said candidate peak and minimum energy frame sequence producing step comprises generating a predetermined threshold signal and comparing the first order autocorrelation signal corresponding to each successive peak energy frame to said predetermined threshold signal.

14. Apparatus for partitioning a speech pattern into syllabic subunits according to claim 10 wherein said peak energy frame signal sequence generating means comprises means for low pass filtering said frame sequence of speech energy signals, means for determining the peak filtered energy frame signals, and means for selecting speech energy frames corresponding to said determined low pass filtered peak frames.

15. Apparatus for partitioning a speech pattern into syllabic subunits comprising:
means responsive to said speech pattern for generating a frame sequence of autocorrelation signals;
means for forming a sequence of signals representation of the speech energy in successive frames of the speech pattern responsive to said frame sequence of autocorrelation signals;
means responsive to said speech pattern energy signals for generating a sequence of signals representative of the speech pattern peak energy frames;
means responsive to said speech energy signals sequence and said peak energy frame signal sequence for generating a signal representative of the minimum speech energy frame between each pair of successive peak energy frames;
means responsive to said peak and minimum energy frame signals and said autocorrelation signals for producing a sequence of candidate syllabic subunit signals;
means responsive to the said peak and mimimum energy frame signals for forming a first signal representative of the speech energy for each candidate syllabic subunit energy frame relative to the speech energy of the adjacent candidate syllabic subunit peak energy frames;
means responsive to the said peak and minimum energy frame signals for forming a second signal representative of the energy of each candidate syllabic subunit peak energy frame relative to the energy of the maximum speech energy frame;
means responsive to the peak and minimum energy frame signals for forming a third signal representative of the duration of each candidate syllabic subunit;
means for combining said first, second and third signals of each candidate syllabic subunit to form a signal corresponding to a figure of merit for said candidate syllabic subunit; and
means responsive to said candidate syllabic subunit figure of merit signals for selecting a sequence of speech pattern syllabic subunits.

16. Apparatus for partitioning a speech pattern into syllabic subunits according to claim 15 wherein:
said autocorrelation signal sequence generating means comprises means for forming a frame sequence of zeroth order autocorrelation signals; and
said speech energy signal sequence forming means comprises means responsive to said zeroth order autocorrelation signals for generating a sequence of speech energy representative signals; and
said peak energy frame signal sequence generating means comprises means for low pass filtering said frame sequence of speech energy signals, means for determining peak low pass filtered speech energy signals, and means jointly responsive to said peak low pass filtered energy signals and said energy signal sequence for selecting speech energy signal frames corresponding to said determined peak low pass filtered speech energy signals.

17. Apparatus for partitioning a speech pattern into syllabic subunits according to claim 16 wherein said means for generating said frame sequence of autocorrelation signals comprises means responsive to said speech pattern for forming a sequence of first order autocorrelation signals.

18. Apparatus for partitioning a speech pattern into syllabic subunits according to claim 17 wherein:
said candidate syllabic unit signal producing means comprises means jointly responsive to said peak energy signals, said minimum energy signals and said first order autocorrelation signals for selecting candidate peak and minimum energy frames.

19. Apparatus for partitioning a speech pattern into syllabic subunits according to claim 18 wherein:
said first signal forming means comprises means responsive to said candidate peak and minimum energy frame signals for generating for each candidate syllabic subunit a signal representative of the difference between the speech energy of each candidate peak energy frame and the average speech energy of the preceding and succeeding candidate peak energy frames;
said second signal forming means comprises means responsive to candidate peak and minimum energy frame signals for generating for each candidate syllabic subunit a signal representative of the difference between the energy of each candidate peak energy frame and the energy of the maximum speech energy frame; and
said third signal forming means comprises means responsive to the candidate syllabic subunit peak energy frame and the adjacent minimum energy frames for generating a signal representative of the duration of each candidate syllabic subunit.

20. Apparatus for partitioning a speech pattern into syllabic subunits according to claim 19 wherein said means for combining said first, second and third signals to form said figure of merit signal for each candidate syllabic subunit comprises summing signals proportional to said first, second and third signals.

21. Apparatus for partitioning a speech pattern into syllabic subunits according to claims 15, 16, 17, 18, 19, or 20 wherein said syllabic subunits are syllables.

22. Apparatus for partitioning a speech pattern into syllabic subunits according to claims 15, 16, 17, 18, 19, or 20 wherein said syllabic subunits are demisyllables.

23. Apparatus for partitioning a speech pattern into syllabic subunits according to claim 10 wherein said candidate peak and minimum energy frame sequence producing means comprises means for generating a predetermined threshold signal and means for comparing the first order autocorrelation signal corresponding to each successive peak energy frame to said predetermined threshold signal.

* * * * *